(No Model.) 3 Sheets—Sheet 1.
W. D. GRAY.
SHAFT COUPLING.
No. 408,011. Patented July 30, 1889.
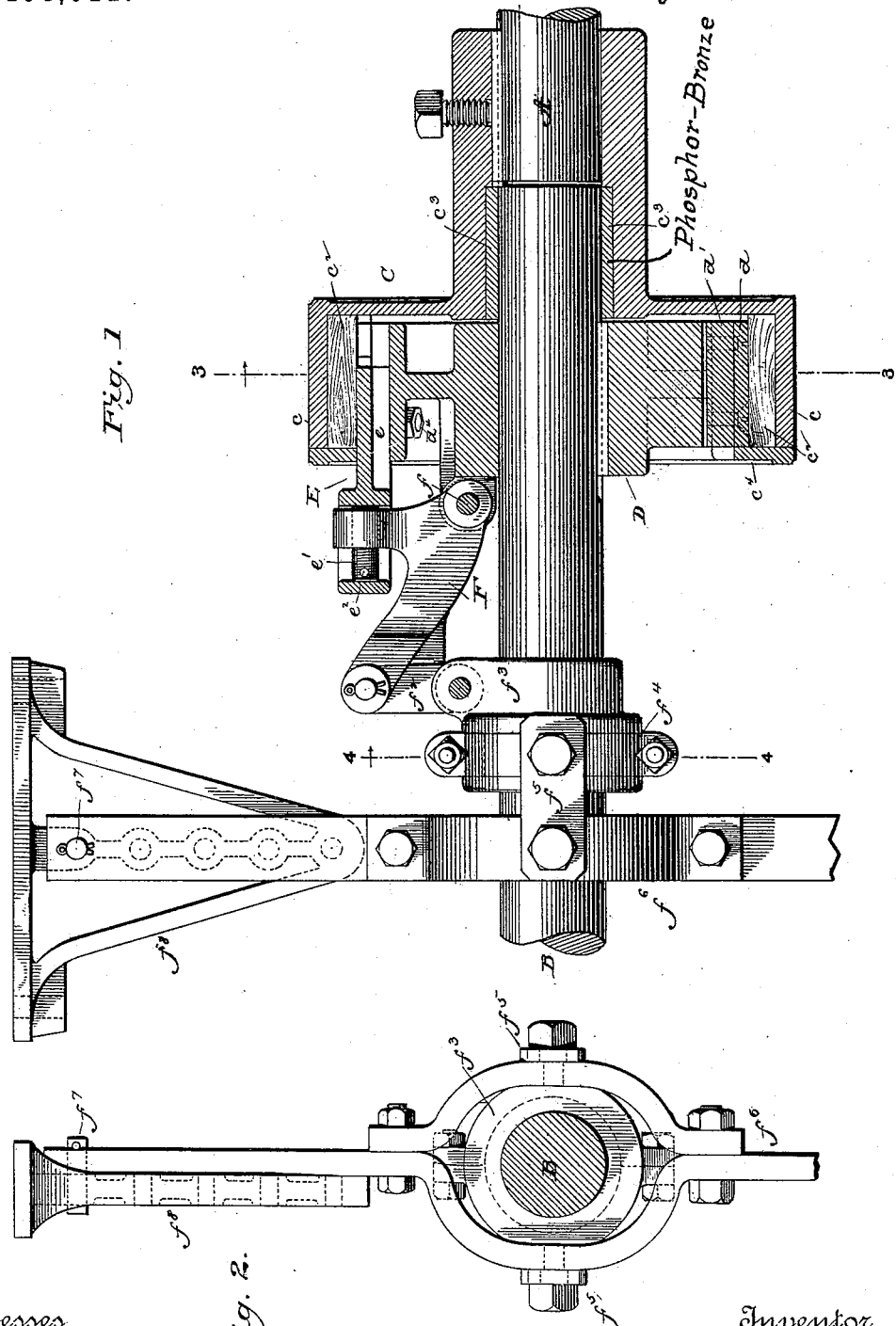
Witnesses
N. N. Mortimer
N. R. Kennedy
Inventor
W. D. Gray
By Phil T. Dodge
Attorney (No Model.) 3 Sheets—Sheet 2.
W. D. GRAY.
SHAFT COUPLING.

No. 408,011. Patented July 30, 1889.

ON LINE 3—3

ON LINE 4—4

Witnesses
Inventor
W. D. Gray
By Phil. T. Dodge
Attorney (No Model.) 3 Sheets—Sheet 3.

W. D. GRAY.
SHAFT COUPLING.

No. 408,011. Patented July 30, 1889.

ON LINE 6—6  ON LINE 7—7

Witnesses
Inventor
W. D. Gray
By Phil T. Dodge
Attorney

UNITED STATES PATENT OFFICE.

WILLIAM D. GRAY, OF MILWAUKEE, WISCONSIN, ASSIGNOR TO THE EDWARD P. ALLIS & COMPANY, OF WISCONSIN.

SHAFT-COUPLING.

SPECIFICATION forming part of Letters Patent No. 408,011, dated July 30, 1889.

Application filed March 11, 1889. Serial No. 302,879. (No model.)

*To all whom it may concern:*

Be it known that I, WILLIAM D. GRAY, of Milwaukee, in the county of Milwaukee and State of Wisconsin, have invented certain Improvements in Shaft-Couplings, &c., of which the following is a specification.

The object of this invention is to provide a strong and simple clutch, by means of which two shafts or their equivalents may be coupled end to end and maintained in exact alignment.

Figure 3:
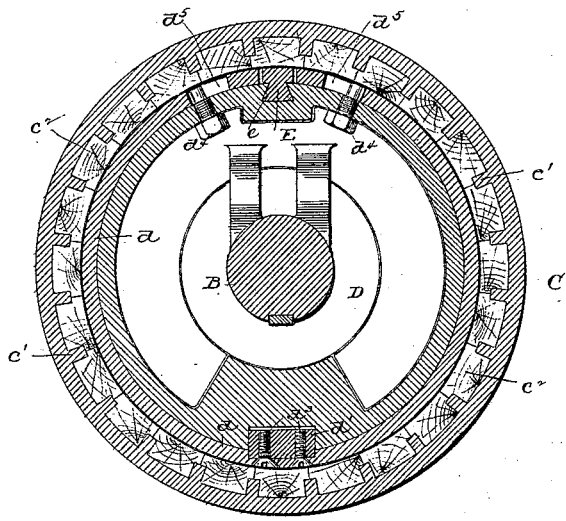
Figure 4:
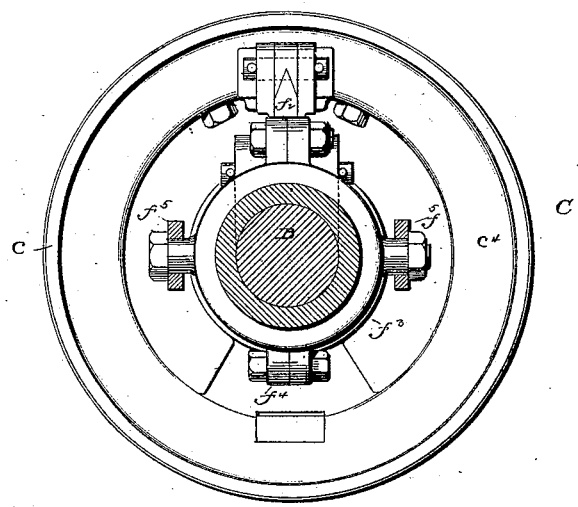
Figure 5:
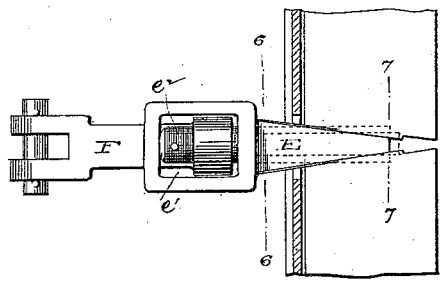
Figure 6:
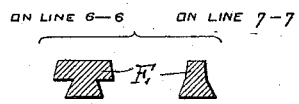
Figure 7:
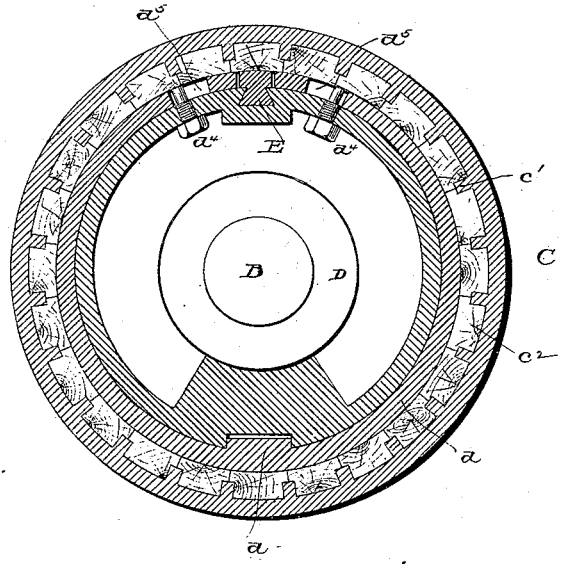

In the accompanying drawings, Figure 1 is an axial vertical section through my clutch in operative position, the controlling-lever and its supporting-bracket being also shown in side elevation. Fig. 2 is an elevation of the operating-lever and its adjuncts, looking endwise of the shaft. Fig. 3 is a cross-section on the line 3 3 of Fig. 1. Fig. 4 is a vertical section on the line 4 4 of Fig. 1, looking in the direction indicated by the arrow. Fig. 5 is a plan view of the spreading-wedge and adjacent parts. Fig. 6 is a cross-section of the same on the lines 6 6 and 7 7 respectively. Fig. 7 is a cross-section showing the elastic friction-ring in the tapered form preferably employed.

Referring to the drawings, A and B represent the two shafts which it is required to couple together arranged end to end. The shaft A is keyed or otherwise secured rigidly in a shell or cup C, one end of which is enlarged in the form of a disk with a peripheral overhanging flange or rim $c$ thereon. This annular flange is ribbed internally, as shown at $c'$, to receive and hold wooden lining-blocks $c^2$, driven tightly in place to present a continuous surface which is turned off smooth and true on the inside. The shaft B is seated snugly, but so as to turn freely within the shell C, which is provided with a wearing-ring $c^3$, of phosphor-bronze or like material, to receive it.

D represents a hub keyed rigidly to the end of the shaft B, and located within the flange of the shell. This inner hub is encircled by a ring $d$, of steel or like material, turned smooth on its outer surface and connected on the inside to the hub by a transverse key $d'$. This key, which is seated in grooves in the two parts, is connected to the rim by screws $d^3$. At a point diametrically opposite this key the ring is divided transversely, as shown in Figs. 3 and 5, and its ends beveled in opposite directions to fit the sides of an intermitting wedge E, having a divided lip $e$ seated in a groove in the hub to guide it in the direction of the axis of the shafts. As the wedge is forced inward, it separates the ends of the ring and expands the latter so that it engages frictionally throughout its length with the surrounding wooden lining of the shell, thus establishing a firm connection between the shafts.

It is to be noted that both the key $d'$ and the wedge E serve as drivers for the ring, and that the ring is free to expand or move radially at all points in its length. These facts, coupled with the fact that the hub is kept in a true central position by the bearing of its shaft in the shell, insure a close contact and uniform pressure between the frictional surfaces at all points. The driving-strain, being applied at two points on opposite sides, balances in such manner as to avoid side strains and the tendency of the clutch devices, shaft, and shaft-bearings to wear eccentrically, as is the case with many clutches now in use.

Lateral motion of the ring upon the carrying-hub is prevented by means of stud-bolts $d^4$, seated in the hub and bearing at the outer ends in slots $d^5$ in the ends of the ring.

The friction-ring may be of uniform thickness, as shown in Fig. 3, or it may be of diminishing thickness from the middle toward the ends, as in Fig. 7, in which case the surface of the supporting-hub will be eccentric to the shafts. The key $d'$ may be integral with the ring, as shown. The advantage of tapering the ring lies in the fact that it acts quickly and expands uniformly.

A ring $c^4$ is commonly screwed or otherwise secured to the face of the outer shell, as shown in the drawings, to prevent the escape of the wooden lining and to keep the hub in place when the clutch is disconnected from the shaft; but this ring is not a necessary feature of my construction.

In order that the wedge may be conveniently operated and that it may be held firmly in place without subjecting the running-surfaces to increased friction, I provide an angular lever F and pivot the same at $f$ between ears on the hub. One end of this lever is projected through an opening $e'$, formed for the purpose in the end of the wedge. A screw $e^2$, passed through the lever, bears at its two ends against the opposite walls of the opening $e'$ and serves as a means of adjusting the wedge in relation to the lever and other operating parts hereinafter described. This screw, which is practically a part of the lever, is used to compensate for wear in the various joints and to regulate the point to which the wedge will be advanced by the lever, the lever stopping always at the same position.

At the opposite end the lever is connnected by a link $f^2$ to a collar $f^3$, mounted loosely on the shaft and grooved circumferentially at one end to receive an encircling collar $f^4$, which is in turn connected by links $f^5$ to a hand-lever $f^6$. This lever, which may be supported in any ordinary manner, is adapted to encircle the shaft, as shown in Fig. 2, and is commonly mounted at its upper end in a pivot-pin $f^7$, seated in a hanger $f^8$, adapted for attachment to the ceiling or other support.

It will be observed that the hanger is provided with a series of holes for the pivot-pin at different heights, and this in order that the parts may be adjusted for shafts located at different distances from the ceiling. When the lever is moved in the direction indicated by the arrow in Fig. 1, the inner end of the link $f^2$ is carried beneath the lever F and the latter caused to force the wedge inward and expand the driving-ring until finally the link assumes a perpendicular position beneath the lever, as shown in Fig. 1. When in this position, it holds the lever securely without subjecting the moving parts to additional friction.

Having thus described my invention, what I claim is—

1. The flanged shell and the independent internal hub having the grooves in its opposite sides, in combination with the expansible friction-ring encircling the hub and having the rib or key $d$ seated loosely in one of the grooves and the wedge seated in the other groove and acting between the ends of the ring, whereby the ring is enabled to move radially and expand uniformly throughout its length.

2. The flanged shell, the independent hub, and the extensible ring, in combination with the wedge having the opening in its end, the lever, and the wedge operating and adjusting screw seated in the lever and bearing at its ends against the opposite walls of the wedge-opening, whereby the lever is enabled to positively advance and retract the wedge.

3. In a friction-clutch, the outside rim, the internal hub having the eccentric periphery, the tapered expansible ring, and means, substantially as shown, for expanding said ring.

4. In combination with the shell, hub-expanding ring, wedge, and wedge-operating lever, the sliding collar and link to operate said lever, the non-rotating ring $f^4$, the hand-lever to actuate the same, the hanger $f^8$, and the adjustable pivot connecting the hand-lever and hanger, whereby the parts are adapted for use with shafts at different distances from the ceiling or wall.

In testimony whereof I hereunto set my hand, this 29th day of January, 1889, in the presence of two attesting witnesses.

WILLIAM D. GRAY.

Witnesses:
  WM. BANNEN,
  RICHARD HOPPIN.